United States Patent [19]
Lee

[11] Patent Number: 4,842,560
[45] Date of Patent: Jun. 27, 1989

[54] WAVE POWERED PROPULSION SYSTEM FOR WATERCRAFT

[76] Inventor: Choong G. Lee, 510 F Keawe St., Honolulu, Hi. 96813

[21] Appl. No.: 138,042

[22] Filed: Dec. 28, 1987

Related U.S. Application Data

[63] Continuation-in-part of Ser. No. 781,719, Sep. 30, 1985, abandoned.

[51] Int. Cl.⁴ .............................................. B63H 19/02
[52] U.S. Cl. .............................................. 440/9; 440/5; 114/61
[58] Field of Search .................. 440/9, 5, 59, 113, 84; 114/123, 283, 61

[56] References Cited

U.S. PATENT DOCUMENTS

| | | | |
|---|---|---|---|
| 1,443,626 | 1/1923 | Hinckley | 440/9 |
| 3,002,484 | 10/1961 | Dube | 440/9 |
| 3,253,569 | 5/1966 | Serdar | 440/59 |

FOREIGN PATENT DOCUMENTS

954962  4/1964  United Kingdom .................... 440/9

*Primary Examiner*—Sherman D. Basinger
*Assistant Examiner*—Edwin L. Swinehart
*Attorney, Agent, or Firm*—Stephen F. K. Yee

[57] ABSTRACT

A watercraft is provided with a propulsion system having a hydraulic power plant driving a propeller through a transmission. The power to operate hydraulic pumps in the power plant is derived from wave motion by buoyant members connected to the power plant by outrigger arms. Undulation of the waves is converted to fluid pressure by the vertical movement of the buoyant members reciprocating pistons in the hydraulic pumps. Pressurized fluid is applied to a fluid motor driving the transmission. A steering assembly is operatively associated with one of the buoyant members.

23 Claims, 4 Drawing Sheets

WAVE POWERED PROPULSION SYSTEM FOR WATERCRAFT

CROSS REFERENCE TO RELATED APPLICATION

This application is a continuation-in-part of pending application Ser. No. 781,719, filed Sept. 30, 1985 now abandoned.

BACKGROUND OF THE INVENTION

The present invention relates to watercrafts and to propulsion systems for watercrafts, and more particularly to a watercraft propulsion system deriving its power from the waves.

Different proposals have been made for utilizing the energy in the waves to propel a watercraft such as a boat, a ship or the like. Some of these proposals have used the up-and-down motion caused by the waves to operate a compressor or a pump to pressurize a fluid which is used directly or indirectly to propel the watercraft. For example, in U.S. Pat. No. 3,002,384, Dube describes a boat in which pumps operated by pivoting arms connecting pontoons to the boat are used to provide supplemental pressurized fluid to drive the propellers in case the main engine fails. Normally, however, the pistons in the pumps are pressurized so that the pontoons are forced into the water to raise the boat into a planing orientation, and the pumps act as shock absorbers. A conventional fuel-consuming engine provides pressurized fluid which is normally used to drive the propellers, and the pumps powered by the pontoons provide auxilliary power in case of main engine failure. The propellers are driven directly by hydraulic motors, and the propulsion system for the boat does not include a transmission system.

In U.S. Pat. No. 1,172,737, Roach describes a ship which has a bow float, a stern float, and a number of side floats which are connected to the ship such that their up-and-down movements compress air in cylinders and directly drive the propellers through a gearing arrangement. The compressed air is stored in tanks to provide protection for the ship structure and is provided to air motors to drive the ship.

Devlan, in U.S. Pat. No. 154,324, provides a vessel with wells extending vertically therethrough and open at both ends. Floats within the wells rise and fall with the waves to compress air within cylinders, and the compressed air is used directly or indirectly for propulsion. The up and down motion of the floats is also used to drive gears connected to the ship's propellers. In U.S. Pat. No. 3,527,188, issued to Shepard et al., a ship is made of two sections joined by a hinged connection and interconnected with plunger-and-cylinder assemblies so that the front section moves up and down with the wave to pressurize a fluid used to drive a hydraulic motor which in turn drives an electric generator, and the electricity is used to operate an electric motor connected to the ship's propellers.

White, U.S. Pat. No. 1,532,459, describes a boat having a submerged plate which moves with the waves to operate a pump which pressurizes water used to drive a water turbine connected to a propeller. In the British patent to Hocevar, No. 94,962, the wave-powered propulsion system includes life boats which are pivotally connected to the ship by outrigger arms, with the pivotal motion of the outrigger arm used to drive a piston-cylinder arrangement through pulleys. The piston pressurizes a fluid used to drive a fluid motor connected to the ship's propellers. In addition to locating the floats at the sides of the ship, Hocevar also indicates that a float may be towed behind the ship which is also used to drive a hydraulic piston.

In another group of proposals, the motion of the wave is transferred directly to driving gears by means of a pivoted lever. For example, in the patent to Kalfas, U.S. Pat. No. 2,048,339, a float moves up and down with the waves to oscillate a lever connected to a gear train coupled to a propeller shaft, while in Kapolkin, U.S. Pat. No. 2,364,535, a boat built in two sections is joined by a pivot, with the pivotal motion of the front section oscillating a lever driving a transmission connected to a propeller. In Lamberti, U.S. Pat. No. 4,389,843, several float-and-pivoted-arm assemblies are connected by sprockets and chains to gear trains operating an electric generator which supplies current to a boat-propelling electric motor.

In the patent to Schulze, U.S. Pat. No. 1,033,476, barrels move with the waves and the pivotal motion of levers attached thereto is transmitted to drive gears by interconnecting chains. The gears may drive the propellers directly or may be used to drive an electric generator, with electricity being stored and used to drive an electric motor connected to the propeller. Reed, U.S. Pat. No. 2,556,340, uses a rocking pendulum weight to drive a hydraulic compressor which provides pressurized fluid to a hydraulic motor used to drive the propellers for a small boat.

While not specifically related to wave-powered propulsion systems, U.S. Pat. Nos. 4,210,821, 4,184,336, 3,664,125, 2,477,691 and 901,117 describe water-borne buoyant devices utilizing wave energy to produce electricity.

The proposals advanced thus far for utilizing the energy of waves to propel a watercraft, such as those mentioned above, have disadvantages, and none have enjoyed any degree of acceptance of which the applicant is aware.

SUMMARY OF THE INVENTION

Accordingly, it is an object of the present invention to provide an improved propulsion system for a watercraft which is powered by wave motion.

Another object of the invention is to provide an improved propulsion system of the foregoing type in which the energy of wave motion is converted to hydraulic pressure and mechanical energy.

Another object of the invention is to provide a watercraft incorporating an improved propulsion system of the foregoing type. A further object of the invention is to provide a watercraft of the foregoing type in which the steering control system is integrated with the propulsion system.

According to the present invention, these and other objects are achieved in a watercraft having a propulsion system which includes a hydraulic power plant coupled to the watercraft's propellers by a transmission. The power plant includes a plurality of double-acting hydraulic pumps which pressurizes a fluid used to drive a fluid turbine connected to the transmission. The power to operate the pumps is derived from the waves by a pair of stern outrigger arms extending from the left and right stern portions of the watercraft and a rear outrigger arm, with each arm joining a buoyant body to the hydraulic power plant. A rudder assembly is operatively associated with the rear outrigger arm and aft buoyant body.

The up and down motions of the waves are transmitted to the hydraulic power plant by the vertical movement of each outrigger arms and its associated buoyant body. Reciprocation of the piston pressurizes the fluid in the pump, which is supplied to the turbine.

BRIEF DESCRIPTION OF THE DRAWINGS

The above description, as well as further objects, features and advantages of the present invention, will be more fully appreciated by reference to the following description of a presently-preferred but nonetheless illustrative embodiment in accordance with the invention, when taken in connection with the accompanying drawings wherein.

DESCRIPTION OF THE PREFERRED EMBODIMENT

Figure 1:
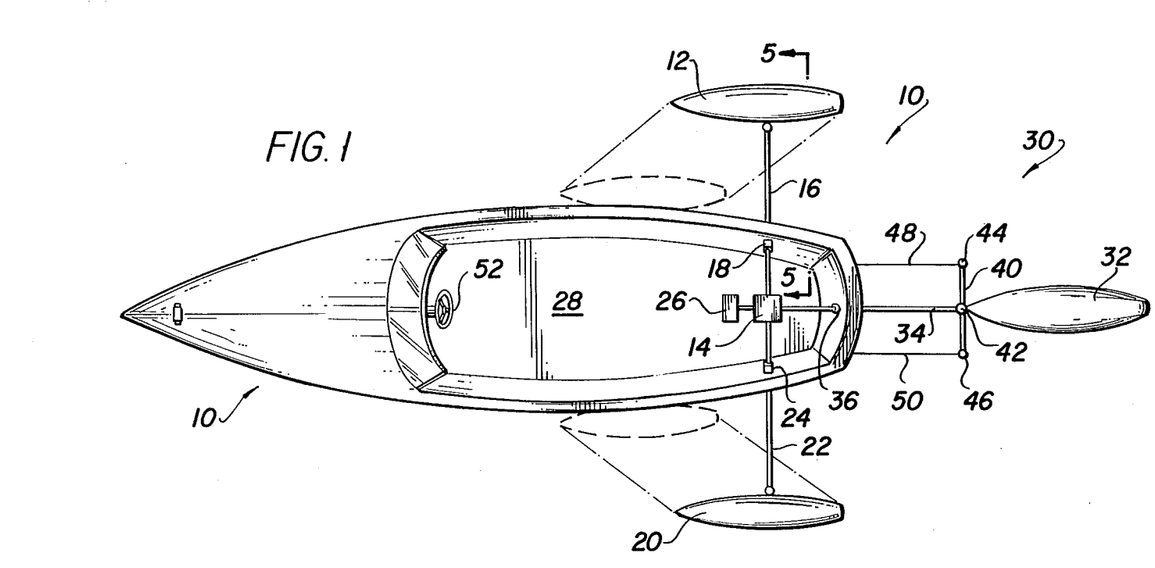
FIG. 1 is a plan view of a watercraft incorporating the propulsion system of the present invention.
Figure 2:
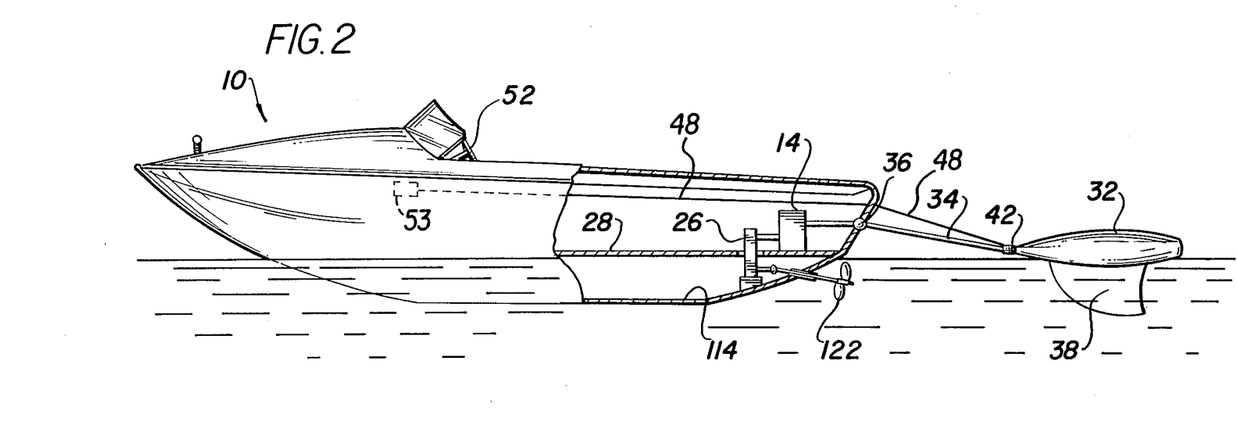
FIG. 2 is a side elevational view, partly in section, of the watercraft of FIG. 1, showing some of the components of the propulsion system.

FIGS. 1 and 2 show a watercraft 10, which for example may be a boat of known design and construction, incorporating the propulsion system of the present invention. Outboard of the right stern of the watercraft 10 is a buoyant body 12 which is connected to a hydraulic power plant 14 by an outrigger-like arm 16. A joint 18 supports the arm 16 at the point where the arm penetrates the side wall of the watercraft to permit vertical, or up and down, movement of the buoyant body 12 and the arm relative to the watercraft.

Outboard of the left stern of the watercraft 10 is a second buoyant body 20 which is connected to the hydraulic power plant 14 by an outrigger-like arm 22. A joint 24 supports the arm 22 at the point where the arm penetrates the watercraft to permit vertical movement of the arm and the buoyant body 20. The power provided by the hydraulic power plant 14 is transferred to the watercraft's driving mechanism by a gear assembly 26 mounted on the deck 28 adjacent to the power plant, as will be described more fully below.

The outrigger-like arms 16 and 22 are provided with hinge-type joints to permit the buoyant bodies 12 and 20 to be folded against the watercraft 10, as shown by the dotted lines in FIG. 1. This is described more fully below in connection with FIGS. 5 and 6.

Located aft of the watercraft 10 is a combined buoyant body and a steering rudder assembly, designated generally as 30, which includes a third buoyant body 32 connected to the hydraulic power plant 14 by an outrigger-like arm 34, with the arm being supported by a joint 36 at the point where the arm penetrates the transom of the watercraft.

It should be noted that the buoyant bodies 12, 20 and 32 are preferably hollow, watertight structures made of a suitable material and shaped to minimize water drag. The joints 18, 24 and 36 are supported by the sides and the transom of the watercraft 10 are appropriately sealed to prevent entry of water, and are designed to permit principally up-and-down movement of the outrigger arms, with almost no movement of the arm in any other direction.

As shown more particularly in FIG. 2, a rudder 38 is rigidly attached to and supported below the aft buoyant body 32. To permit steering movement of the buoyant body 32 and the rudder 38, the forward end of the body 32 is rigidly attached to a rudder bar 40, which in turn is rotationally supported at the aft extremity of the outrigger arm 34 by a pivot or rotational joint 42. The ends of the rudder bar 40 are provided with rotational connections 44 and 46 to which one end of steering control links 48 and 50 are respectively attached, with the other ends of the links suitably connected in any known fashion to a steering mechanism in the watercraft 10, such as a steering wheel 52 and steering control coupling 53. Note FIG. 1. In this manner turning of the steering wheel 52 will apply tension to either of the control links 48 or 50, depending upon which direction the wheel is turned, causing the rudder bar 40 to rotate either clockwise or counter-clockwise about the pivot joint 42, as viewed in FIG. 1. With the rudder 38 rigidly attached to the rudder bar 40, rotation of the bar also rotates the rudder. Thusly arranged, the aft buoyant body 32 with the attached rudder 38 and rudder bar 40 are rotationally supported as a single unit as viewed in FIG. 1, at the aft extremity of the outrigger arm 34 by the pivot joint 42. This arrangement permits the buoyant body 32, rudder 38 and rudder bar 40 to rotate as an assembly, referred to above as assembly 30, and at the same time vertical motion of these elements is possible with the hinge connection of the outrigger arm 34.

Control links 48 and 50 may be either rigid or flexible links, and preferably are flexible cables. Both types of control linkages are so well known in the art to be used in and for watercraft control systems that further description is deemed unnecessary. Similarly, the prior art is replete with various proposals for watercraft control systems using both flexible and rigid control linkages with a steering assembly, or a combined steering-and-propulsion assembly, which is vertically relocatable relative to the aft portion of the watercraft, into and out of the water, or to a different vertical attitude. Examples of such proposals are described in U.S. Pat. Nos. 172,367, 2,956,536, 2,975,750 and 3,211,126. U.S. Pat Nos. Re, 18,602, 1,309,928, 1,824,887, 1,864,857, 2,837,051, 2,928,631 and 3,094,097 each describes a cable-operated steering control system with provisions for accommodating vertical movement of a steering or a combined steering-and-propelling apparatus in which the points of attachment of the cable are also vertically movable. The system in U.S. Pat. No. 3,253,569 uses rigid control links.

As illustrated in the latter group of patents, various techniques may be used to accommodate the vertical movement of the steering and propelling assembly and at the same time maintain steering control with the control linkages. These techniques may include biased pulleys which physically move to maintain controlling tension in the linkages, hydraulic or pneumatic mechanisms, electro-mechanical systems, and the like, which compensate for changes in the slack or tension in the control linkages as the steering system moves vertically, to maintain steering control. Any of these techniques, or any other known, suitable technique can be incorporated into the watercraft 10 of the present invention, to provide steering control for the assembly 30 and at the same time accommodate vertical movement thereof.

Another technique for maintaining the tension in the control cables is illustrated in U.S. Pat. No. 4,318,308, the disclosure of which is incorporated herein by reference. While the described apparatus is specific to aircraft control surfaces, it can be readily adapted by the skilled practitioner to maintain the tension in control links 48 and 50 as assembly 30 moves up and down in response to wave motion.

Control links 48 and 50 pass freely through openings in the watercraft's transom to accommodate vertical motion of the assembly 30. The openings have suitable sealing means to preclude water entry. While FIG. 2 shows the control links 48 and 50 passing through the transom at the upper portion thereof, they can extend through the transom at the middle, bottom or at any elevation without affecting the operation of the assembly 30. Alternatively, the control links can pass over the transom, without penetrating it.

Figure 3:
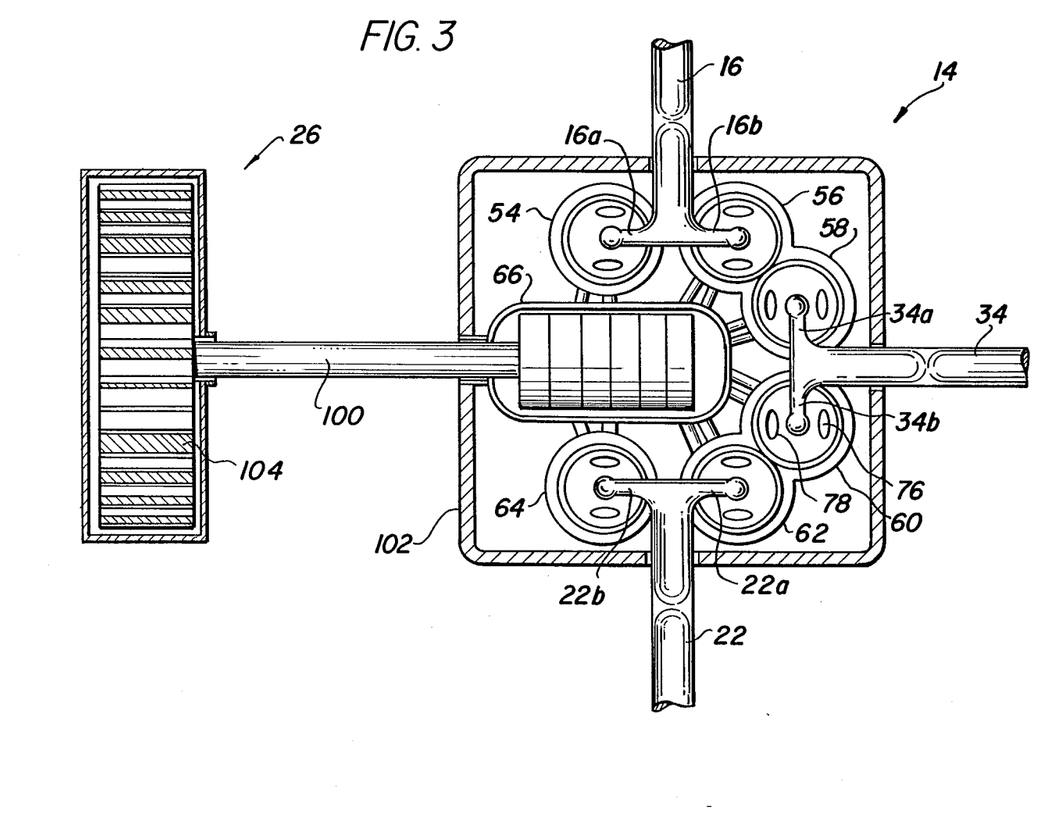
FIG. 3 is a plan view showing in more detail components of the propulsion system.
Figure 4:
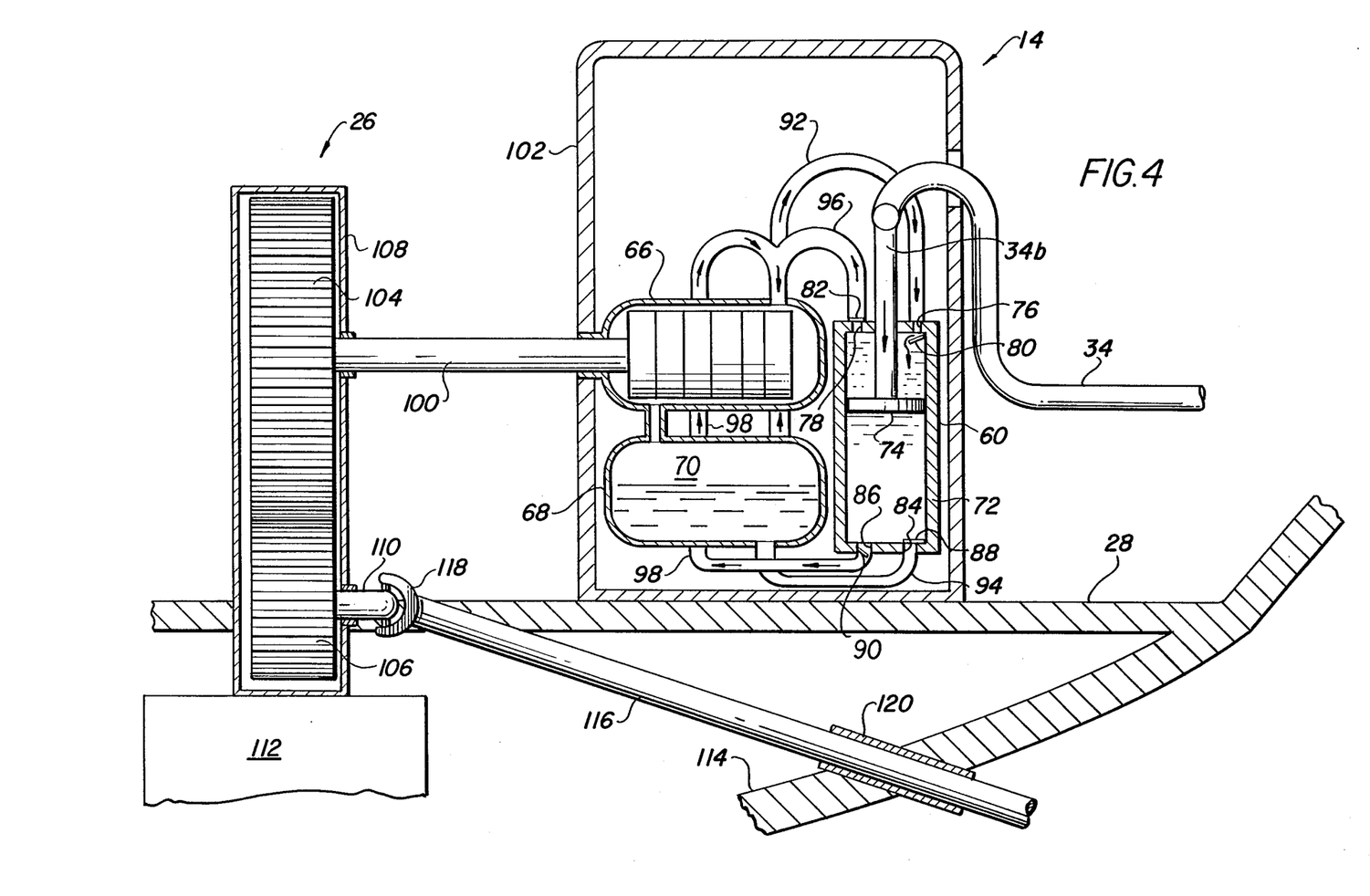
FIG. 4 is an elevational view of the components shown in FIG. 3.

Referring now to FIGS. 3 and 4, the hydraulic power plant 14 and gear assembly 26 are shown in more detail. The power plant 14 includes a plurality of pumps, which may be six in number as shown in FIG. 3, powered by the inboard portions of the outrigger arms connecting the buoyant bodies to the power plant. Each outrigger arm powers two pumps; thus, arm 16 powers pumps 54 and 56; arm 34 powers pumps 58 and 60; and arm 22 drives pumps 62 and 64. To permit each arm to simultaneously actuate two pumps, the inboard end portion of each of the arms 16, 22 and 34 is bifurcated into forks 16a, b, 22a, b and 34a, b, respectively, with each fork being attached at its end to the piston of a pump such that the fork functions as a piston rod. Each pump is of the double-acting type in which fluid is pressurized on both the up and the down strokes of the piston. Fluid conduits connect the exhaust, or pressure, ports of each hydraulic pump to a power turbine 66 and the intake ports to a fluid reservoir or sump 68, with the turbine and reservoir interconnected to drain fluid from the turbine into the reservoir, such as with the drain connection 70.

Using the hydraulic pump 60 (FIG. 4) as being representative of the structure and operation of the plurality of pumps in the power plant 14, the double-acting pump 60 includes a cylinder 72 having at each end wall a pair of orifices or ports, each being provided with a one-way valve of known design. Reciprocably disposed within the cylinder 72 is a piston 74 connected to the fork 34b of the outrigger arm 34. The upper end wall, as viewed in FIG. 4, of the cylinder 72 is provided with an inlet port 76 and an outlet port 78. Flow through the inlet 76 is controlled by a one-way check valve 80 and flow through the outlet port 78 is controlled by a similar one-way check valve 82, which is partially visible in FIG. 4. Similarly, the opposite end wall of the cylinder 72 is provided with an inlet port 84 and an outlet port 86, with the flow through the inlet port being controlled by a one-way check valve 88 and a similar valve 90 controlling the flow through the outlet port. A fluid conduit 92 connects the inlet port 76 to the fluid reservoir 70, and a separate fluid conduit 94 connects the other inlet port 84 to the reservoir. Pressurized fluid flowing through the outlet port 78 is directed to the turbine 66 by a conduit 96 while pressurized fluid from the lower chamber of the cylinder 72 is directed through the outlet port 86, to the turbine via a conduit 98.

The structure of pumps 54–58, 62 and 64 are identical to pump 60 just described. All of the fluid conduits and connections have not been shown in the drawings to enhance the clarity of the figures.

As shown in FIG. 4, the turbine 66 may include several stages of blades coaxially mounted on a shaft 100 which transmits the power from the hydraulic power plant 14 to the gear assembly 26. The components of the power plant 14 are housed within an enclosure 102 supported on the deck 28 of the watercraft 10.

Within the gear assembly 26, the shaft 100 is secured to a first driving gear 104 meshing with a second, output gear 106 rotationally supported within a gear housing 108 by an output shaft 110. While not specifically shown in the drawings, the gears 104 and 106 are rotationally supported within the housing 108 by suitable friction-reducing elements. The gear assembly 26 is supported on a platform 112 mounted on the bottom 114 of the craft 10.

The shaft 110 is connected to a propeller shaft 116 by a universal joint or coupling 118. A sleeve bearing 120 rotationally supports the propeller shaft 116 at the point the shaft passes through the bottom 114 of the watercraft 10 and seals against entry of water. As shown in FIG. 2, a propeller or screw 122 is secured to the exterior end of the drive shaft 116.

It may be desirable to support the buoyant bodies, particularly bodies 12 and 20, so that they may be moved from their respective extended or operational positions, shown by the solid lines in FIG. 1, to retracted positions along the sides of the watercraft 10, as shown by the dotted lines. This may be achieved by providing each of the outrigger-like arms 16 and 22 with pivotal joints which may be locked in place. Shown in FIGS. 5 and 6 for the arm 16 is an example of a suitable joint; arm 22 would be similarly equipped.

Figure 5:
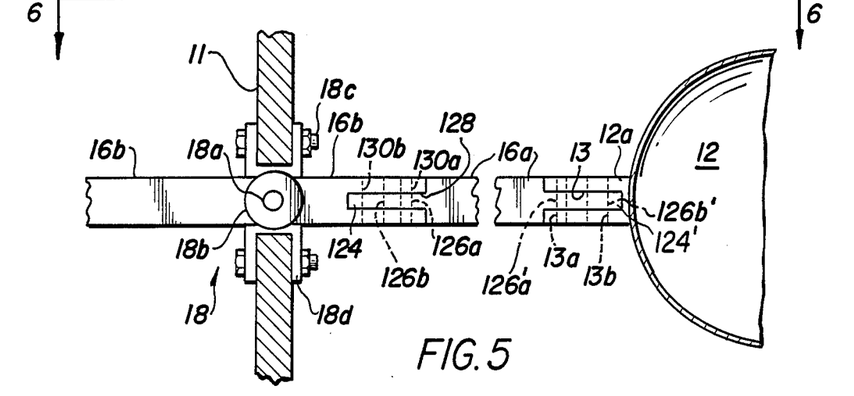
FIG. 5 is a partial sectional view as seen along line 5—5 in FIG. 1.
Figure 6:
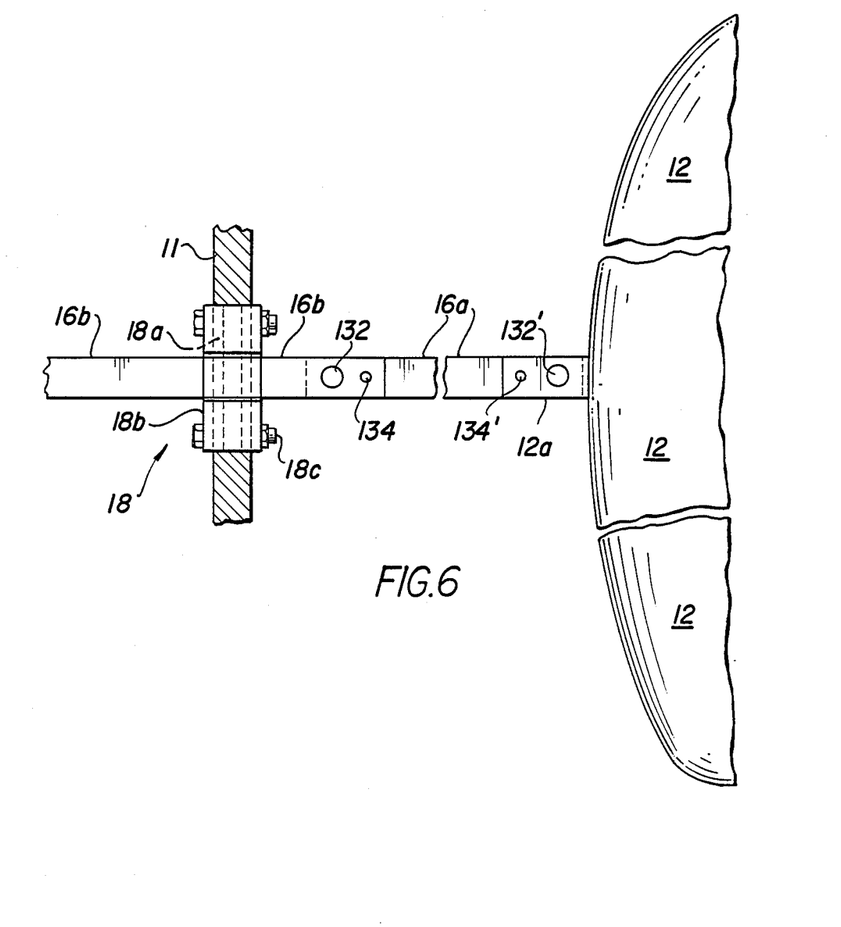
FIG. 6 is a partial sectional view as seen along line 6—6 in FIG. 5.

Arm 16 has an outboard section 16a and an inboard section 16b, the latter being pivotally mounted on sidewall 11 by the joint 18. Joint 18 may be a pin-type hinge, as shown, having a pin 18a rotatably disposed within a housing or sleeve 18b received within an opening in the sidewall 11. Sleeve 18b is suitably attached to the sidewall 11, such as with bolts or other suitable fasteners 18c passed through the sidewall and openings in flanges 18d on the sleeve.

Outboard arm section 16a is provided on its ends with a tongue or tab portion 124 and 124' extending longitudinally along an axis passing through the mid-thickness of the section. Each tongue 124, 124' is provided with a pair of transverse bores 126a, b and 126a', b', preferably of different diameters. The right end (FIGS. 5, 6) of arm 16a has been identified for convenience with reference characters having a "prime" superscript. The outboard extremity of arm section 16b is provided with a medial slot 128 for receiving the tongue 124 and holes 130a and 130b which align with bores 126a and 126b, respectively, when the arm sections are assembled as shown in FIGS. 5 and 6. A pivot pin 132 extends through aligned openings 126b and 130b to attach arm section 16a to section 16b. The pin 132 may be permanently or removably secured. A lock pin 134 extends through aligned openings 126a and 130a and is removably attached to the arm sections.

An identical tongue-and-slot connection is provided to attach the arm section 16a to the buoyant body 12 which has a flange 12a provided with a medial slot 13 and holes 13a and 13b extending through the slotted flange. The diameters of holes 13a and 13b correspond respectively to the diameters of bores 126a and 126b, so that when vertically aligned, the opening 13b and 126b receive a pivot pin 132' and the openings 13a and 126a receive a lock pin 134'.

Assembled as shown in FIGS. 5 and 6, the arm sections 16a, b support the buoyant body 12 in its extended, operational position. To position the buoyant body 12 against the side of watercraft 10, lock pins 134 and 134' are withdrawn to permit arm section 16a to rotate about pivot pin 132 and buoyant body 12 to rotate about pivot pin 132', into the dotted-line configuration in FIG. 1. If the pivot pin 132 is made removable, then the arm section 16a may be separated from the arm section 16b, with the outboard arm section 16a and the buoyant body 12 completely detachable from the watercraft 10. Of course, if the pivot pin 132' is also made removable, then the arm section 16a may be completely separated from the buoyant body 12. Removable pins (132, 132' and 134, 134') may be attached to the arm section 16a with flexible links (not shown) to prevent their loss.

Although not specifically shown nor described, the aft outrigger-like arm 34 may be provided with joints such as described above, to permit the folding and/or removal of the aft buoyant body 32.

In operation, the buoyant bodies 12, 20, and 32 rise and fall with the undulations of the waves. The motion of the buoyant bodies is translated into an up-and-down motion of the respective outrigger arms 16, 22 and 34 which connect the buoyant bodies to the hydraulic power plant 14. As shown in FIG. 4, the up-and-down motion of the inboard portion of the outrigger arm for each of the buoyant bodies, such as arm 34, causes the piston 74 of pump 60 to reciprocate within the cylinder 72. For the operational phase shown in FIG. 4, the piston 74 is beginning its downward travel, causing the intake valve 80 to open and closing the pressure port valve 82. Opening of the inlet valve 80 and the reduced-pressure condition within the cylinder 72 created by the downward movement of piston 74 draws fluid from the reservoir 70 into the upper chamber of the cylinder through the conduit line 92. At the same time, as the piston 74 is traveling downwardly the inlet valve 88 is closed and the outlet valve 90 is opened, permitting the piston to force the fluid within the lower portion of cylinder 72 through the pressure fluid line 98 into the power turbine 66.

As shown in the drawing, the pressurized fluid from the pump 60 can be directed at selected stages of the turbine 66. The other hydraulic pumps 54, 56, 58, 62 and 64 would operate in a similar fashion.

Power from the turbine 66 is transfered by the shaft 100 to the driving, or input gear 104 in the gear assembly 26. Gear 104 transmits the power to the driving gear 106 and its associated shaft 110. The power transmission path continues from the shaft 110, through the universal joint 118 and to the propeller 122 by the propeller shaft 116.

Fewer than six hydraulic pumps may be incorporated into the power plant, although with the configuration illustrated at least one pump would be associated with each outrigger arm and buoyant body assembly, and more than six pumps may be provided. Similarly, the specific construction of the turbine 66 may be changed to suit the power requirements. While a driving gear-driven gear assembly has been illustrated, other gearing arrangements and power transmission mechanisms may be utilized to transmit the power from the turbine to the propeller shaft. Two propellers may be provided to drive the watercraft.

It is intended that the wave-powered propulsion system of the present invention would be the sole or, at least, the primary propulsive mechanism for the watercraft. However, if desired, an auxillary power source may be provided, such as an electric motor or an internal combustion engine appropriately coupled to drive the propeller. If an electric motor is used, the fluid motor or the transmission may be readily modified in a suitable fashion to drive an electric generator, with one or more batteries provided to store the electricity used to power the electric motor.

In addition to providing the energy to propel the watercraft, the outrigger arm-buoyant body assemblies also enhance the stability of the watercraft and reduce the risk of capsizing in rough waters. For increased safety, each of the buoyant bodies may be divided by transverse bulkhead so that damage to a portion of the body does not disable the entire structure.

While it has been indicated above that the buoyant bodies are hollow, watertight structures, it is understood that these bodies may be otherwise constructed, as long as they are buoyant. Thus, for example, the bodies may be molded or otherwise formed of solid buoyant material, or they may be hollow shells filled with a buoyant material such as foam or closed, hollow beads or spheres, or the like, and sealed.

As shown in FIG. 4, the inboard end portion of each outrigger arm is bent upwardly into an inverted U-shape. This configuration provides a more effective lever arm to reciprocate the piston. This configuration also provides adequate travel for the piston without requiring an additional pivot joint in the outrigger arm in order to accommodate angular motion between the piston rod or fork and the cylinder, thus resulting in a simpler structure. However, if necessary, one or more pivot joints may be provided along the length of the outrigger arm if angular clearance is a problem.

The turbine has been used in the above description as illustrative of an appropriate fluid-actuated or fluid-driven motor which converts the pressure of the working fluid into a rotary, mechanical energy. Other types of fluid motors may be equally suitable.

Similarly, the use of a gear assembly transmission between the turbine and the propeller shaft provides flexibility in tailoring the power output of the power plant to the driving power requirements for the watercraft. Other types of power transmission may be used with the present invention. Alternatively, the propulsion system may be configured to omit the transmission, with the output of the turbine being coupled directly to the propeller shaft and with the use of known means to control the supply of pressurized working fluid to the turbine in order to regulate its power output.

Those skilled in the art will recognize that many of the design aspects of the illustrated embodiment may be altered or combined with other features to accomplish various performance objectives without departing substantially from the principal and scope of the invention. Although all of the components associated with an operating propulsion system for a watercraft have not been specifically described and illustrated, it is understood that such components are known and would be appropriately incorporated into the operative power plant, transmission system and propulsion system.

Of course, variations of the specific construction and arrangement of the wave-powered propulsion system disclosed herein can be made by those skilled in the art without departing from the invention as defined in the appended claims.

What is claimed:

1. A wave-powered propulsion system for a watercraft, comprising:
   a first and second hydraulic pump, each having an axially movable piston for pressuring and moving a working fluid;
   means for actuating said first pump, including an arm connected to said piston and buoyant means connected to said arm and responsive to wave motion to reciprocate said piston;
   second means for actuating said second pump, including an elongated element connected at one end to the piston of said second pump and connected at the other end to a buoyant member disposed aft of the watercraft and responsive to wave motion to reciprocate the piston in said second pump;
   a fluid motor coupled to said pumps and operated by the working fluid from said pumps;
   means for propelling the watercraft;
   transmission means coupling said fluid motor and propelling means to transmit the driving output of said fluid motor to said propelling means; and
   a steering assembly operatively associated with said aft buoyant member and adapted to move vertically with said buoyant member in response to wave motion and to move rotationally to provide steering control for the watercraft.

2. A wave-powered propulsion system as set forth in claim 1, wherein said steering assembly comprises a rudder supported by said aft buoyant member.

3. A wave-powered propulsion system as set forth in claim 2, wherein said steering assembly further comprises:
   a support member to which said rudder and said aft buoyant member are attached; and
   means joining said support member to said elongated element and adapted to permit steering rotational motion of said support member, said rudder and said buoyant member as a unit, said steering rotational motion being independent of the movement of said buoyant member in response to wave motion.

4. A wave-powered propulsion system as set forth in claim 2, wherein the buoyant means associated with the actuating means for said first pump is disposed on one side of the watercraft, and further comprising a third hydraulic pump having a separate buoyant means disposed on the other side of the watercraft, and an arm connecting said separate buoyant means to the piston in said third pump.

5. A wave-powered propulsion system as set forth in claim 4, further comprising a fourth, a fifth and a sixth hydraulic pump associated respectively with each of the arm connected to and operated by each of said buoyant means, said separate means and said buoyant member, with all pumps operatively connected to said fluid motor.

6. A wave-powered propulsion system as set forth in claim 5, further comprising means to support each of said connecting arm and said elongated element so as to permit only vertical movement as the associated buoyant means and buoyant member moves in response to wave motion.

7. A wave-powered propulsion system as set forth in claim 6, wherein each of said connecting arm and said elongated element is provided with an articulated joint to permit selective placement of the associated buoyant means and buoyant member in a first position adjacent to the side of the watercraft or in a second position away from the watercraft.

8. A wave-powered propulsion system for a watercraft, comprising:
   a hydraulic power plant for pressurizing and moving a working fluid, said power plant having a plurality of hydraulic pumps, each pump having a piston axially movable in a cylinder;
   a fluid motor operatively coupled to said hydraulic power plant;
   means for propelling the watercraft;
   transmission means operatively coupling said fluid motor and said propelling means; and
   means responsive to wave motion for operating said power plant, including a connecting arm associated with each of said pumps, one end of each arm being connected to the piston of the pump and the other end of said arm being connected to a buoyant member which moves in response to wave motion, each of said pistons being reciprocated by movement of each associated connecting arm and buoyant member, wherein one of the buoyant members is adapted to be positioned aft of the watercraft and is provided with a steering assembly which moves vertically with said buoyant member in response to wave motion and rotates independently of the connecting arm associated with this buoyant member to provide steering control for the watercraft.

9. A wave-powered propulsion system as set forth in claim 8, wherein each of said pumps is of a double-action type, with the piston pressurizing and moving the working fluid on both the upward and downward strokes.

10. A wave-powered propulsion system as set forth in claim 8, wherein each of said pumps has at least two pistons operatively connected to a single arm and its associated buoyant member.

11. A wave-powered propulsion system as set forth in claim 8, wherein said steering assembly includes:
   a rudder supported by said aft buoyant member;
   a support member to which said aft buoyant member and said rudder are attached; and
   means mounting said support member to said connecting arm associated with said aft buoyant member to permit steering rotational movement of said support member and attached rudder and buyant member as a unit.

12. A wave-powered propulsion system as set forth in claim 11, wherein said transmission means includes a gear assembly having an input coupled to said fluid motor and an output coupled to said propelling means for the watercraft.

13. A wave-powered propulsion system as set forth in claim 11, further comprising means to support each of said connecting arms so as to permit only vertical movement as the associated buoyant member moves in response to wave motion.

14. A wave-powered propulsion system as set forth in claim 11, wherein each of said connecting arms is provided with an articulated joint to permit selective placement of the associated buoyant member in a first position adjacent to the side of the watercraft or in a second position away from the watercraft.

15. In combination with a watercraft having a power plant, a propelling means, a transmission interconnecting the power plant and the propelling means, and a steering means, said power plant being wave actuated and comprising:

a hydraulic power plant for pressurizing and moving a working fluid and having a plurality of hydraulic pumps, each pump having a piston axially movable in a cylinder;

a fluid motor coupled to said hydraulic power plant and adapted to be driven by said working fluid; and means responsive to wave motion for operating said power plant, including a connecting arm associated with each of said pumps, one end of each arm being connected to the piston of the pump and the other end of said arm being connected to a buoyant member which moves vertically in response to wave motion, each of said pistons being reciprocated by movement of each associated connecting arm and buoyant member, wherein one of the buoyant members is adapted to be positioned aft of the watercraft and is provided with a steering assembly which moves vertically with said buoyant member in response to wave motion and rotates independently of the connecting arm associated with this buoyant member to provide steering control for the watercraft.

16. A combination as set forth in claim 15, wherein each of said pumps is of a double-action type, with the piston pressurizing and moving the working fluid on both the upward and downward strokes.

17. A combination as set forth in claim 16, further including means for supporting each of said connecting arms on said watercraft to permit substantially only vertical movement of said arm.

18. A combination as set forth in claim 15, wherein said steering assembly includes:

a rudder supported on said aft buoyant member;

a support member to which said aft buoyant member and said rudder are attached;

means mounting said support member to said connecting arm associated with said aft buoyant member to permit steering rotational movement of said support member and attached rudder and buoyant member as a unit; and means operatively connecting said support member to said steering means on the watercraft.

19. A combination as set forth in claim 18, wherein said transmission means includes a gear assembly having an input coupled to said fluid motor and an output coupled to said propelling means for the watercraft.

20. A combination as set forth in claim 19, wherein in addition to said aft buoyant member disposed aft of the watercraft, at least one buoyant member is disposed on each side of said watercraft, each buoyant member being connected to a hydraulic pump by its associated connecting arm.

21. A combination as set forth in claim 20, wherein each of said pumps has at least two pistons operatively connected to each connecting arm and its associated buoyant member.

22. A combination as set forth in claim 20, wherein each of said connecting arms is provided with an articulated joint to permit selective placement of the associated buoyant member in a first position adjacent to the side of the watercraft or in a second position away from the watercraft.

23. A combination as set forth in claim 22, wherein said articulated joint has removable fixing means to permit disconnection of the joint and separation of said buoyant member from the watercraft.

* * * * *